(12) United States Patent
Yu et al.

(10) Patent No.: US 7,171,301 B2
(45) Date of Patent: Jan. 30, 2007

(54) METHOD AND SYSTEM FOR DETECTING AN ABSOLUTE PRESSURE SENSOR MALFUNCTION

(75) Inventors: Songping Yu, Troy, MI (US); Paul A. Pietrzyk, Beverly Hills, MI (US); Gary L. Danhoff, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 594 days.

(21) Appl. No.: 10/778,875

(22) Filed: Feb. 13, 2004

(65) Prior Publication Data

US 2005/0182555 A1 Aug. 18, 2005

(51) Int. Cl.
*G06F 7/00* (2006.01)

(52) U.S. Cl. ...................... 701/114; 701/107

(58) Field of Classification Search ................ 701/114, 701/110, 107, 108, 103, 102; 73/118.1, 118.2, 73/117.3
See application file for complete search history.

(56) References Cited

U.S. PATENT DOCUMENTS

| | | | |
|---|---|---|---|
| 4,338,825 A * | 7/1982 | Amlani et al. ......... 73/862.382 |
| 5,331,936 A | 7/1994 | Messih et al. .............. 123/480 |
| 5,505,179 A | 4/1996 | Brennan ...................... 123/479 |
| 5,698,780 A | 12/1997 | Mizutani et al. ........... 73/118.2 |
| 6,115,664 A | 9/2000 | Cullen et al. ............... 701/102 |
| 6,508,111 B2 | 1/2003 | Osaki et al. ............... 73/118.1 |

FOREIGN PATENT DOCUMENTS

JP 62-93470 A * 4/1987

* cited by examiner

*Primary Examiner*—Hieu T. Vo
(74) *Attorney, Agent, or Firm*—Julia Voutyras; Richard M. Sharkansky

(57) ABSTRACT

A method for detecting a malfunction in a manifold absolute pressure sensor used in an internal combustion engine. The method includes obtaining a plurality of samples from the manifold absolute pressure sensor. A plurality of samples is obtained from a mass airflow sensor for measuring air flow to the engine. A plurality of inferred manifold absolute pressures is estimated from the plurality of samples obtained from the mass airflow sensor. A linear functional relationship is determined between manifold absolute pressure and inferred absolute pressure from the obtained samples of the manifold pressure sensor and the estimated inferred manifold absolute pressures, such functional relationship having an offset term and a slope. A comparison is made between the determined offset term and the determined slope with a predetermined offset threshold and a predetermined slope threshold level, respectively.

7 Claims, 3 Drawing Sheets

METHOD AND SYSTEM FOR DETECTING AN ABSOLUTE PRESSURE SENSOR MALFUNCTION

TECHNICAL FIELD

This invention relates generally to methods and systems for detecting an absolute pressure sensor malfunction.

BACKGROUND

As is known in the art, manifold absolute pressure (MAP) is used to provide critical information for EGR flow delivery and EGR system monitoring for an internal combustion engine. One technique used to provide absolute pressure is by inferring such pressure, i.e. an "inferred MAP", calculated from mass airflow sensor readings. This technique is described in U.S. Pat. No. 5,505,178, issued Apr. 9, 1996, inventors Daniel G. Brennan and U.S. Pat. No. 5,331,036, issued Jul. 26, 1994, inventors Messih et al, both assigned to the same assignee as the present invention, the entire subject matter of both such U.S. Patent Nos. being incorporated by reference.

As is also known in the art, in some systems MAP sensors are required to prove a measure of manifold absolute pressure. In such systems it may be required to detect a malfunction of such MAP sensor. One technique suggested for this purpose is to compare each MAP sensor output reading sample directly with the "inferred MAP" at a specific idle engine operating condition. The accuracy of such method, however, may be effected by noise.

SUMMARY

In accordance with the present invention, a method is provided for detecting a malfunction in a manifold absolute pressure sensor used in an internal combustion engine. The method includes obtaining a plurality of samples from the manifold absolute pressure sensor. A plurality of samples is obtained from a mass airflow sensor for measuring air flow to the engine. A plurality of inferred manifold absolute pressures is estimated from the plurality of samples obtained from the mass airflow sensor. A linear functional relationship is determined between manifold absolute pressure and inferred absolute pressure from the obtained samples of the manifold pressure sensor and the estimated inferred manifold absolute pressures, such functional relationship having an offset term and a slope. A comparison is made between the determined offset term and the determined slope with a predetermined offset threshold and a predetermined slope threshold level, respectively.

In accordance with another feature of the invention, is provided for detecting a malfunction in a manifold absolute pressure sensor used in an internal combustion engine. The method includes: obtaining a plurality of samples from the manifold absolute pressure sensor; obtaining a plurality of samples from a mass airflow sensor for measuring air flow to the engine; estimating a plurality of inferred manifold absolute pressures from the plurality of samples obtained from the mass airflow sensor; determining a polynomial relationship between manifold absolute pressure and inferred absolute pressure from the obtained samples of the manifold pressure sensor and the estimated inferred manifold absolute pressures; and comparing coefficients of the polynomial relationship predetermined coefficients.

In accordance with still another feature of the invention, a method is provided for detecting a malfunction in a manifold absolute pressure sensor used in an internal combustion engine. The method includes: (a) estimating values of a parameter K_offset and a parameter K_slope, where such parameters are related to manifold absolute pressure (MAP) and inferred manifold absolute pressure (INF_MAP) in accordance with: MAP=K_Offset+K_Slope*INF_MAP+Noise; and (b) determining a deviation of such estimated values from nominal values of such parameters.

Thus, with such method, the information provided by Mass Air Flow (MAF) sensor and MAP sensor to check the functional state of the sensor. A MAF sensor is a standard device for nearly all gasoline vehicles. It provides needed information to infer the air pressure in manifold, which is designated as INF_MAP in the production Powertrain Control strategy. Systematically comparing these two pressure values with wide engine operation conditions will provide an effective way to confirm the rationality of MAP output.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
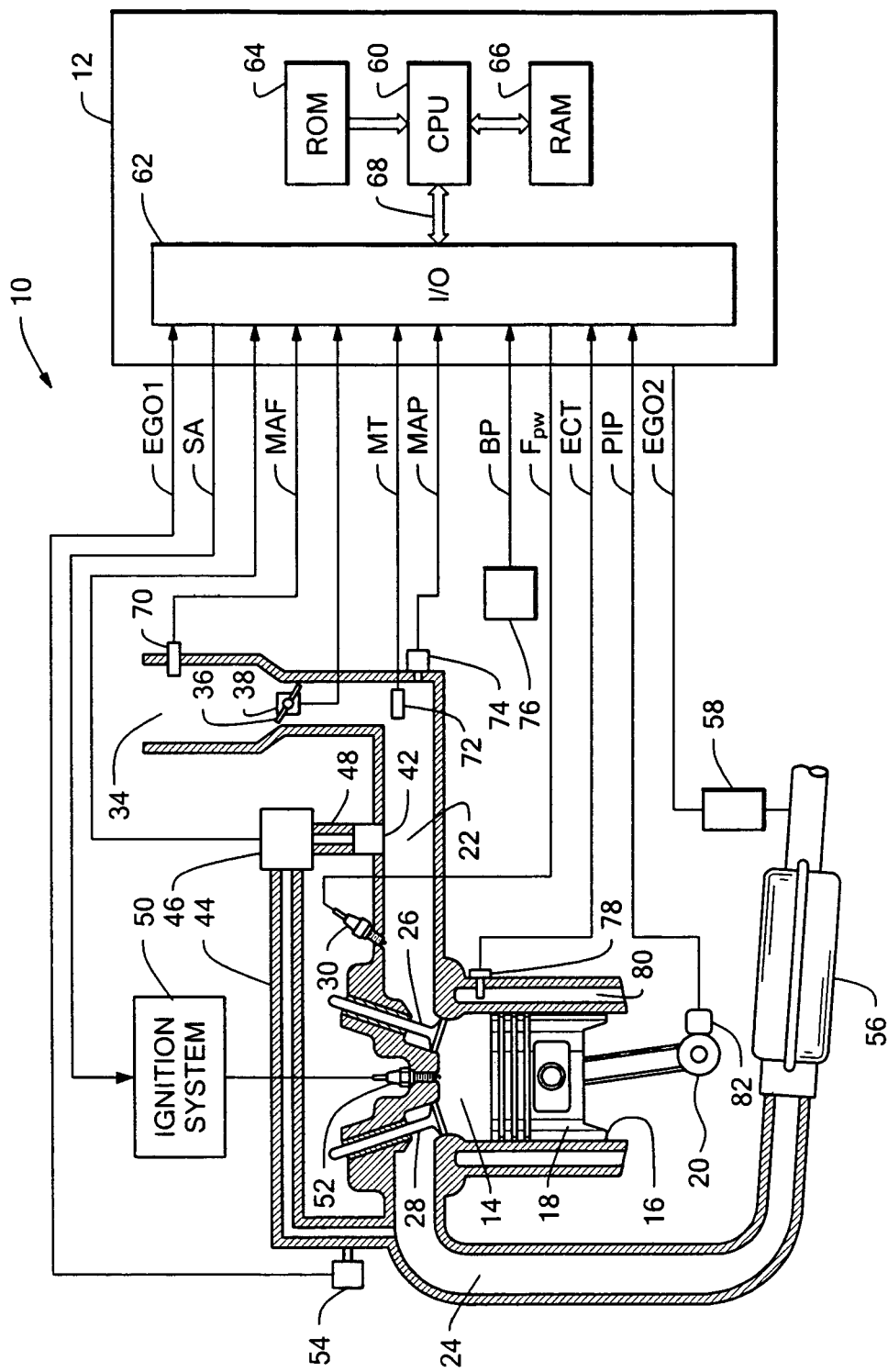
FIG. 1 is a diagram of an internal combustion engine system according to the invention.

Referring now to FIG. 1, an internal combustion engine 10 is shown having a plurality of cylinders, one cylinder of which is shown in FIG. 1, controlled by electronic engine controller 12. Engine 10 includes combustion chamber 14 and cylinder walls 16 with piston 18 positioned therein and connected to crankshaft 20. Combustion chamber 14 is shown communicating with intake manifold 22 and exhaust manifold 24 via respective intake valve 26 and exhaust valve 28. Intake manifold 22 is also shown having fuel injector 30 coupled thereto for delivering liquid fuel in proportion to the pulse width of signal $F_{PW}$ from controller 12. Both fuel quantity, controlled by signal $F_{PW}$ and injection timing are adjustable. Fuel is delivered to fuel injector 30 by a conventional fuel system (not shown) including a fuel tank, fuel pump, and fuel rail. Alternatively, the engine may be configured such that the fuel is injected directly into the cylinder of the engine, which is known to those skilled in the art as a direct injection engine. Intake manifold 22 is shown communicating with throttle body 34 via throttle plate 36. Throttle position sensor 38 measures position of throttle plate 36.

Exhaust manifold 24 is shown coupled to exhaust gas recirculation (EGR) valve 42 via exhaust gas recirculation tube 44 having exhaust gas flow sensor 46 therein for measuring an exhaust gas flow quantity. Exhaust gas recirculation valve 42 is also coupled to intake manifold 22 via orifice tube 48.

Conventional distributorless ignition system 50 provides ignition spark to combustion chamber 14 via spark plug 52 in response to controller 12. Two-state exhaust gas oxygen sensor 54 is shown coupled to exhaust manifold 24 upstream of catalytic converter 56.

Two-state exhaust gas oxygen sensor 58 is shown coupled to exhaust manifold 24 downstream of catalytic converter 56. Sensors 54 and 56 provide signals EGO1 and EGO2, respectively, to controller 12 which may convert these signal into two-state signals, one state indicating exhaust gases are rich of a reference air/fuel ratio and the other state indicating exhaust gases are lean of the reference air/fuel ratio.

Controller 12 is shown in FIG. 1 as a conventional microcomputer including: microprocessor unit 60, input/output ports 62, read-only memory 64, here a semiconductor chip, random access memory 66, and a conventional data bus 68. Controller 12 is shown receiving various signals from sensors coupled to engine 10, in addition to those signals previously discussed, including: a mass air flow (MAF) from mass flow sensor 70 coupled to intake manifold 22 before throttle 38; a measurement of manifold absolute pressure (MAP) from pressure sensor 72 an intake manifold temperature (MT) signal from temperature sensor 74; an engine coolant temperature (ECT) from temperature sensor 78 coupled to cooling sleeve 80; and a profile ignition pickup (PIP) signal from Hall effect sensor 82 coupled to crankshaft 20 and used as an engine speed signal producing a predetermined number of equally spaced pulses every revolution of the crankshaft. Also included is a barometer 76 for measuring barometric pressure, BP.

As described in the above-referenced U.S. Pat. No. 5,331,939, during steady-state conditions, cylinder air charge is essentially linear with manifold air pressure (MAP) at a given engine speed (N). Accordingly, for a given engine design, values for MAP, N, and cylinder air charge may be collected under steady-state conditions at a standard barometric pressure and temperature (e.g., 29.9 in Hg and 100 degrees F.) and plotted, as shown in the example plot of FIG. 2. From that plot, the following equation is developed using a well-known least squares linear regression technique:

$$STAMP = (B0 + B1*N + B2*N^2) + B3*Mc$$

wherein:

STMAP is manifold air pressure at a standard barometric pressure and temperature;

N is the engine speed in RPM;

Mc is the cylinder air charge; and

B0, B1, B2, B3 are engine design specific regression coefficients.

In order to determine a manifold air pressure (MAP) value, i.e., determine an "inferred manifold absolute pressure", INF_MAP), at any given barometric pressure, the equation for STMAP is corrected for changes in barometric pressure from the standard value. This equation is as follows:

$$INF\_MAP = [(B0 + B1*N + B2*N^2)(BP/29.92)] + B3*Mc$$

wherein:

INF_MAP is the inferred manifold absolute air pressure at a given barometric pressure (BP);

BP is barometric pressure (in Hg);

29.92 is the standard barometric pressure (in Hg);

N is the engine speed in RPM;

Mc is the cylinder air charge; and

B0, B1, B2, B3 are the regression coefficients.

As also described in U.S. Pat. No. 5,331,926, MAP is determined from an equation and two look-up tables. The first look-up table is recorded in terms of RPM, the input, and ΔSTMAP/ΔMc, the output. The second look-up table is recorded in terms of RPM, the input, and STMAP, the output. Values for Mc, STMAP and N, which are used to create the two look-up tables, are collected under steady-state conditions at a standard barometric pressure and temperature and plotted, as shown in the example plot of FIG. 2. Using the outputs from the two look-up tables, the value for MAP is determined from the following equation:

$$INF\_MAP = [(STMAP)(BP/29.92)] + (\Delta STMAP/\Delta Mc)*(Mc)$$

wherein:

ΔSTMAP/ΔMc is the output from the first look-up table;

STMAP is the output from the second look-up table;

BP is barometric pressure (in Hg);

29.92 is the standard barometric pressure (in Hg); and

Mc is the cylinder air charge.

Figure 2:
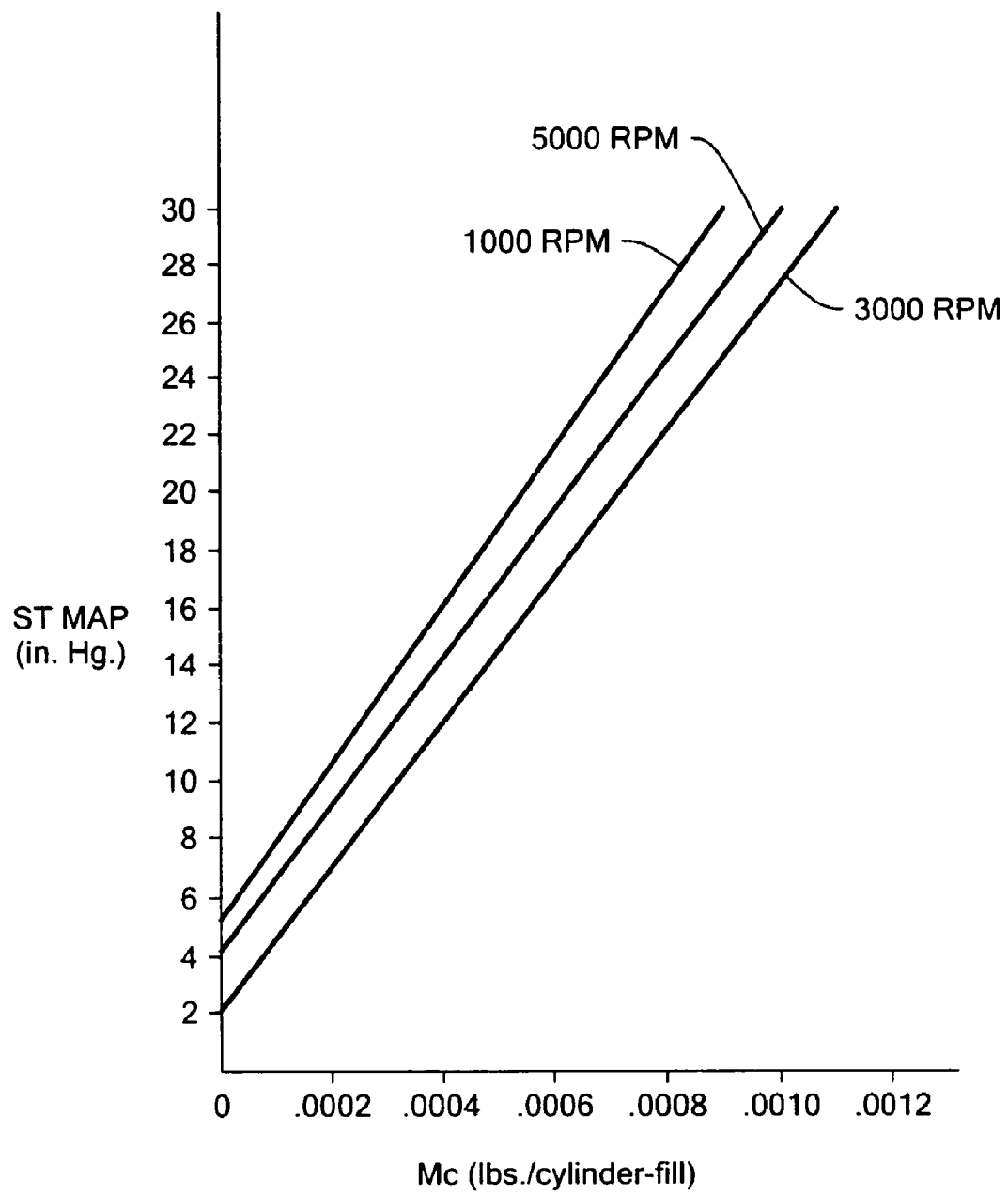
FIG. 2 are curves showing the relationship between air charge and manifold absolute pressure.

Thus, for FIG. 2, there is a linear relationship between STMAP and Mc for a given engine speed. It is noted that the cylinder air charge, Mc, is not identical to the output of MAF sensor, but is directly determined by MAF sensor output. More particularly, the MAF sensor reads the amount of airflow through throttle per minute while the cylinder air charge represents the amount of air in the cylinder for combustion. Once the number of cylinders and engine rotating speed are given, the cylinder air charge can be calculated from MAF output. Thus, the inferred manifold absolute pressure (INF_MAP) may be calculated as described above from the output of the MAF sensor.

Here, in accordance with the present invention, the INF_MAP, calculated as described in the above referenced U.S. Patents from the signal produced by the MAF sensor 70 (FIG. 1) is used to determine whether the MAP sensor 72 is malfunctioning.

More particularly, as noted above, the MAF sensor 70 measure the amount of fresh air flowing into engine manifold and provides needed information to infer the manifold absolute pressure, INF_MAP, and its relations to MAF sensor reading are determined in the engine mapping process described above.

The manifold absolute pressure (MAP) sensor 72 is used to measure the manifold absolute pressure directly. With fully functional MAF and MAP sensors 70, 72 and adequate calibrations, these two manifold pressure values should be in a good agreement. Therefore there exists the following relation:

$$MAP = K\_offset + K\_slope*INF\_MAP + Noise$$

Where:

MAP—Output of MAP sensor 72, indicating the manifold pressure.

INF_MAP—Inferred manifold pressure, based on the MAF 70 sensor reading and engine calibrations.

K_offset—Offset, having a nominal value of 0 with a fully functional and adequately calibrated system.

K_slope—Linear slope between MAP and INF_MAP, having a nominal value of 1 with a fully functional and adequately calibrated system.

Noise—Various sensor noises and hardware variations.

The parameter K_offset and K_slope are estimated here in a manner to be described below and the deviation of their estimated values from the nominal ones are used as an indicator of MAP sensor's functional states.

In accordance with the invention, a particular vehicle model is tests under normal engine operating conditions using a known properly operating MAP sensor and a known properly operating MAF sensor. During this test, or calibration phase, samples of the MAP sensor and MAF sensor are taken simultaneously and the ECU computes, for each MAF sensor sample, an INF_MAP. A plot is made of the MAP samples vs. the calculated INF_MAFs. This process continues until there are sufficient data to generate an adequate plot of MAP samples vs. the calculated INF_MAFs so that, using a linear regression, least mean square fit process, K_offset and K_slope can be determined.

Next, the testing process is repeated using a marginally operational MAP sensor having the known, properly operating condition. Thus, samples of the replacement MAP sensor and prior MAF sensor are taken simultaneously and the ECU computes, for each MAF sensor sample, an INF_MAP. A plot is made of the MAP samples vs. the calculated INF_MAFs. This process continues until there are sufficient data to generate an adequate plot of MAP samples vs. the calculated INF_MAFs so that, using a linear regression, least mean square fit process, K_offset and K_slope can be determined. Here, the calculated K_offset and K_slope represent the maximum acceptable limits, i.e., $K\_offset_{MAX}$=THRES_B and $K\_slope_{MAX}$−1=THRES_A, respectively, of an MAP sensor.

The computer program below is stored in the ROM 64:

accordance with: MAP=K_Offset+K_Slope*INF_MAP+ Noise; and (b) determining a deviation of such estimated values from nominal values of such parameters, such nominal values having been determined during testing of the engine.

Figure 3:
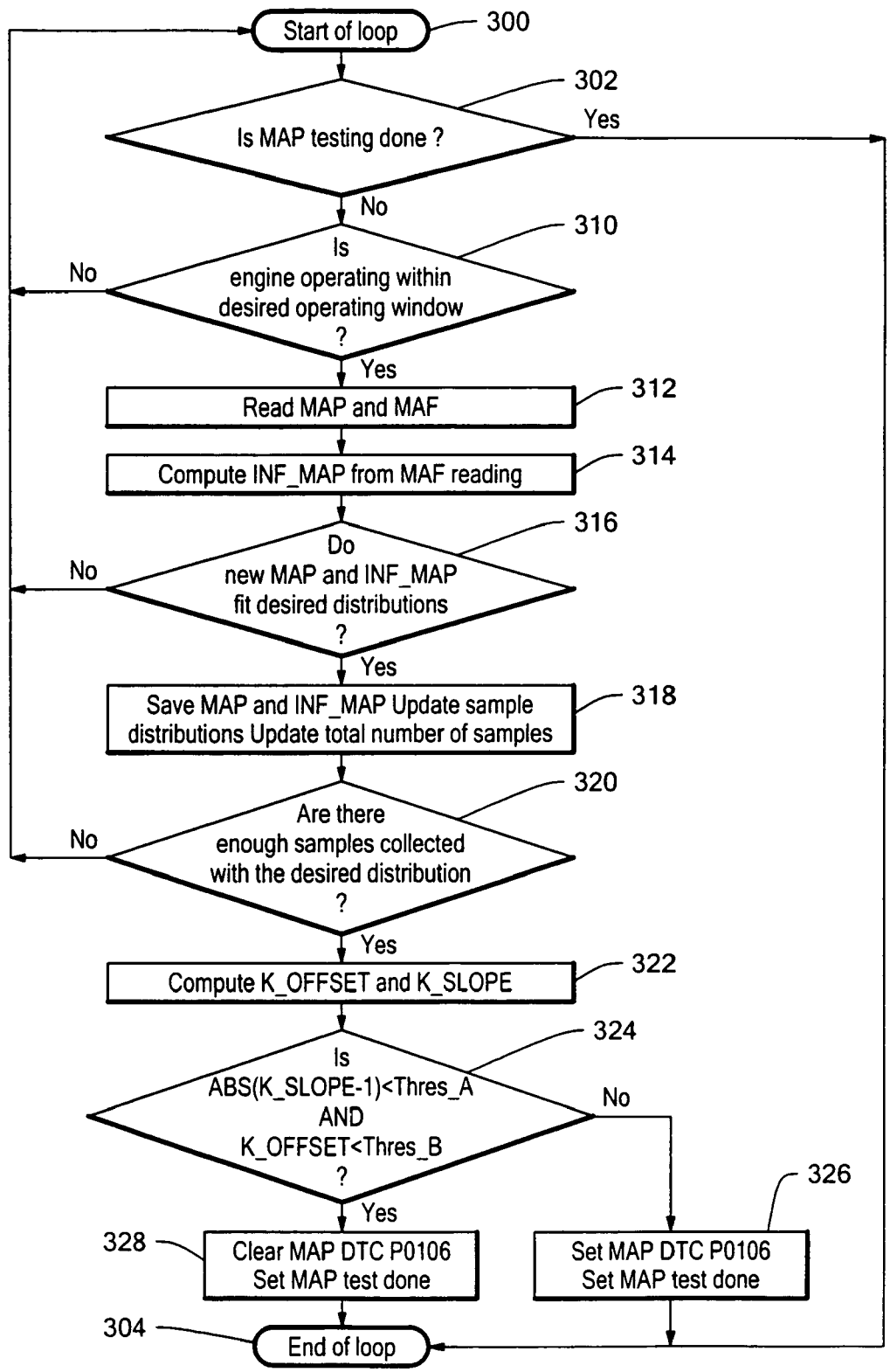
FIG. 3 is a flow diagram of a process used in the engine system of FIG. 1 according to the invention.

Referring now to FIG. 3, a flow diagram of the process is shown. Thus, the process loop, here repeated during operation of the vehicle every 100 milliseconds, for example, begins at Step 300. In Step 302, a determination is mad as to whether MAP testing is completed. If it is, the loop is ended, Step 304; otherwise, the process determines, in Step 310.

In Step 310, a determination is made as to whether the engine is operating within a predetermined desired operating window, e.g., engine temperature, etc. If not, the loop is restarted, Step 300; otherwise, the process reads a sample of MAP and a sample of MAF, Step 312. The process then computes INF_MAP from the MAF reading as described in the above-referenced U.S. Patents, Step 314.

The process then determines whether the new MAP and INF_MAP fit a described distribution, Step 316. If not, the loop is restarted, Step 300; otherwise, the MAP and INF_MAP values are saved, Step 318. Also, the sample

```
IF ( Diagnostic test of MAP sensor not being complete )
{
    IF ( engine operating within desired windows)
    {
            Reading in MAP and MAF values
            Compute INF_MAP from MAF reading
            Check to see if new MAP and INF_MAP values fit the desired sample
            distribution
            IF (Yes )
            {
                Save MAP and INF_MAP
                Update the sample distributions
                Update total number of samples
                IF (       (enough samples collected for calculation )
                     AND (sample distributions satisfactory) )
                {
                    Compute K_offset and K_slope.
                    Calculation complete (CALC_DONE = TRUE)
                }
            }
    }
    IF (CALC_DONE == TRUE)
    {
       IF (       ( Absolute value of (K_slope − 1.0) < Threshold value A, THRES_A)
            AND (Absolute value of (K_offset) < Threshold value B, THRES_B) )
          {
              MAP diagnostic test complete (MIL_DONE = TRUE), where MIL is
              Malfunction Indicator Light
              Clear MAP sensor Diagnostic Trouble Code (DTC) if it was set
          }
          ELSE
          {
              MAP diagnostic test complete (MIL_DONE = TRUE)
              Set MAP sensor Diagnostic Trouble Code (DTC)
          }
    }
}
```

It is noted that the algorithm above can be used to check the functional state of MAF by assuming the functionality of MAP. In general, this algorithm monitors the agreement of the outputs from MAP and MAF sensors.

Thus, the method includes: (a) estimating values of a parameter K_offset and a parameter K_slope, where such parameters are related to manifold absolute pressure (MAP) and inferred manifold absolute pressure (INF_MAP) in distribution is updated and the total of the number of samples in the distribution is updated.

The process then determines whether there are enough samples collected to provide a meaningful regression analysis, Step 321. If not, the loop is restarted, Step 308; otherwise, K_slope and K_offset are computed using a least square fit, linear regression, Step 322. Thus, the analysis determines a linear functional relationship between measured manifold absolute pressure samples and inferred absolute pressure computed, such functional relationship having an offset term, K_offset and a slope, K_slope.

The process then determines whether the absolute value of [K_slope minus 1] is less than the predetermined threshold, THRES_A and whether K_offset is less than the predetermined threshold, THRES_B, Step 324. If either the absolute value of [K_slope minus 1] is not less than the predetermined threshold, THRES_A or K_offset is not less than the predetermined threshold, THRES_B, the MAP DTC is set and the MAP test is set DONE thereby providing an indication that the MAP may be malfunctioning, Step 326. On the other hand if the both absolute value of [K_slope minus 1] is less than the predetermined threshold, THRES_A and K_offset is less than the predetermined threshold. THRES_B, the MAP DTC is cleared and the MAP test is set DONE, Step 328.

It should be noted that because the slope and offset vary with engine speed, a set of K_offset and K_slope may be stored fort each of a plurality if different engine speeds during the test, or calibration phase. Then, during operation, engine speed may be measured to look up the K_slope and K_offset associated with such measured engine speed.

A number of embodiments of the invention have been described. Nevertheless, it will be understood that various modifications may be made without departing from the spirit and scope of the invention. For example, while a linear relationship between MAP samples and INF_MAP computations has been described, in a more general process determining a polynomial relationship between manifold absolute pressure and inferred absolute pressure from the obtained samples of the manifold pressure sensor and the estimated inferred manifold absolute pressures. In such case, the process compares the coefficients of the polynomial relationship predetermined coefficients. Accordingly, other embodiments are within the scope of the following claims.

What is claimed is:

1. An article of manufacture comprising:
a computer storage medium having a computer program encoded therein for detecting a malfunction in a manifold absolute pressure sensor used in an internal combustion engine, said computer storage medium comprising:
code for obtaining a plurality of samples from the manifold absolute pressure sensor;
code for obtaining a plurality of samples from a mass airflow sensor for measuring air flow to the engine;
code for estimating a plurality of inferred manifold absolute pressures from the plurality of samples obtained from the mass airflow sensor;
code for determining a polynomial relationship between manifold absolute pressure and inferred absolute pressure from the obtained samples of the manifold pressure sensor and the estimated inferred manifold absolute pressures; and
code for comparing coefficients of the polynomial relationship predetermined coefficients.

2. The article of manufacture recited in claim 1 wherein such storage medium is a semiconductor chip.

3. An article of manufacture comprising:
a computer storage medium having a computer program encoded therein for detecting a malfunction in a manifold absolute pressure sensor used in an internal combustion engine, said computer storage medium comprising:
code for obtaining a plurality of samples from the manifold absolute pressure sensor;
code for obtaining a plurality of samples from a mass airflow sensor for measuring air flow to the engine;
code for estimating a plurality of inferred manifold absolute pressures from the plurality of samples obtained from the mass airflow sensor;
code for determining a polynomial relationship between manifold absolute pressure and inferred absolute pressure from the obtained samples of the manifold pressure sensor and the estimated inferred manifold absolute pressures;
code for comparing coefficients of the polynomial relationship predetermined coefficients.

4. The article of manufacture recited in claim 3 wherein such storage medium is a semiconductor chip.

5. A method for detecting a malfunction in a manifold absolute pressure sensor used in an internal combustion engine, comprising:
obtaining a plurality of samples from the manifold absolute pressure sensor;
obtaining a plurality of samples from a mass airflow sensor for measuring air flow to the engine;
estimating a plurality of inferred manifold absolute pressures from the plurality of samples obtained from the mass airflow sensor;
determining a linear functional relationship between manifold absolute pressure and inferred absolute pressure from the obtained samples of the manifold pressure sensor and the estimated inferred manifold absolute pressures; such functional relationship having an offset term and a slope;
comparing the determined offset term and the determined slope with a predetermined offset threshold and a predetermined slope threshold level, respectively.

6. A method for detecting a malfunction in a manifold absolute pressure sensor used in an internal combustion engine, comprising:
obtaining a plurality of samples from the manifold absolute pressure sensor;
obtaining a plurality of samples from a mass airflow sensor for measuring air flow to the engine;
estimating a plurality of inferred manifold absolute pressures from the plurality of samples obtained from the mass airflow sensor;
determining a polynomial relationship between manifold absolute pressure and inferred absolute pressure from the obtained samples of the manifold pressure sensor and the estimated inferred manifold absolute pressures;
comparing coefficients of the polynomial relationship predetermined coefficients.

7. A method for detecting a malfunction in a manifold absolute pressure sensor used in an internal combustion engine, comprising:
(a) estimating values of a parameter K_offset and a parameter K_slope, where such parameters are related to manifold absolute pressure (MAP) and inferred manifold absolute pressure (INF_MAP) in accordance with:

$$MAP = K\_Offset + K\_Slope * INF\_MAP + Noise$$

(b) determining a deviation of such estimated values from nominal values of such parameters.

* * * * *